United States Patent
Ettorre et al.

(10) Patent No.: US 8,955,083 B2
(45) Date of Patent: Feb. 10, 2015

(54) METHOD AND ARRANGEMENT FOR SECURE USER AUTHENTICATION BASED ON A BIOMETRIC DATA DETECTION DEVICE

(75) Inventors: Donato Ettorre, Turin (IT); Maura Turolla, Turin (IT); Luigi Licciardi, Turin (IT); Antonio Varriale, Turin (IT); Alessandro Rabbini, Turin (IT)

(73) Assignee: Telecom Italia S.p.A., Milan (IT)

( * ) Notice: Subject to any disclaimer, the term of this patent is extended or adjusted under 35 U.S.C. 154(b) by 941 days.

(21) Appl. No.: 12/448,309

(22) PCT Filed: Dec. 19, 2006

(86) PCT No.: PCT/EP2006/012204
§ 371 (c)(1),
(2), (4) Date: Oct. 27, 2009

(87) PCT Pub. No.: WO2008/074342
PCT Pub. Date: Jun. 26, 2008

(65) Prior Publication Data
US 2010/0049987 A1   Feb. 25, 2010

(51) Int. Cl.
*G06F 21/00* (2013.01)
*G06F 21/42* (2013.01)
(Continued)

(52) U.S. Cl.
CPC ............ *H04L 63/0853* (2013.01); *G06F 21/42* (2013.01); *H04L 63/0861* (2013.01); *G06F 2221/2107* (2013.01); *G06F 21/34* (2013.01); *H04W 12/06* (2013.01); *G06F 21/32* (2013.01)
USPC ............ 726/9; 340/5.81; 340/5.82; 340/5.83; 340/5.84; 340/5.85; 713/186

(58) Field of Classification Search
CPC .................................................. H04L 63/0853

USPC ...................... 340/5.81–5.85; 713/186; 726/9
See application file for complete search history.

(56) References Cited

U.S. PATENT DOCUMENTS 6,636,620 B1* 10/2003 Hoshino ........................ 382/124
6,799,275 B1*  9/2004 Bjorn ............................. 713/186
(Continued)

FOREIGN PATENT DOCUMENTS

EP   1 602 999 A1   12/2005
EP   1 612 714 A2    1/2006
(Continued)

OTHER PUBLICATIONS

"Specification of the Bluetooth System," Bluetooth Specification Version 1.0 B, pp. 149-177, XP-002175286, (Dec. 1, 1999).

*Primary Examiner* — Josnel Jeudy
(74) *Attorney, Agent, or Firm* — Finnegan, Henderson, Farabow, Garrett & Dunner, L.L.P.

(57) ABSTRACT

An arrangement for secure user authentication includes a computer or telecommunication terminal with a smartcard and a device. The smartcard is adapted to securely store biometric information relating to at least one user and the device is adapted to detect biometric data of users. The smartcard and the device include a radio interface for communicating together and a module for exchanging biometric information between each other. In this way, tampering of the transferred biometric information is difficult. In order to increase the security, one or more of the following measures may be used: a secure communication channel between the device and the smartcard, a direct (preferably short range) communication channel between the device and the smartcard and encryption and decryption of biometric information transferred between the device and the smartcard.

27 Claims, 8 Drawing Sheets

(51) Int. Cl.
  *H04L 29/06* (2006.01)
  *G06F 21/34* (2013.01)
  *G06F 21/32* (2013.01)
  *H04W 12/06* (2009.01)

(56) References Cited

U.S. PATENT DOCUMENTS

| | | | | |
|---|---|---|---|---|
| 7,043,643 | B1 * | 5/2006 | Doe et al. | 713/189 |
| 7,194,623 | B1 * | 3/2007 | Proudler et al. | 713/164 |
| 7,278,581 | B2 * | 10/2007 | Ong | 235/492 |
| 7,574,734 | B2 * | 8/2009 | Fedronic et al. | 726/9 |
| 7,711,152 | B1 * | 5/2010 | Davida et al. | 382/115 |
| 7,983,994 | B2 * | 7/2011 | Hurry | 705/72 |
| 2002/0089410 | A1 * | 7/2002 | Janiak et al. | 340/5.53 |
| 2003/0159044 | A1 | 8/2003 | Doyle et al. | |
| 2004/0059913 | A1 * | 3/2004 | de Jong | 713/165 |
| 2004/0257196 | A1 | 12/2004 | Kotzin | |
| 2007/0052672 | A1 * | 3/2007 | Ritter et al. | 345/156 |
| 2009/0322582 | A1 * | 12/2009 | Baugh et al. | 341/176 |

FOREIGN PATENT DOCUMENTS

| | | |
|---|---|---|
| WO | WO 03/007125 A2 | 1/2003 |
| WO | WO 2004/025545 A2 | 3/2004 |
| WO | WO 2005/104584 A1 | 11/2005 |
| WO | WO 2006/056220 A1 | 6/2006 |

\* cited by examiner

METHOD AND ARRANGEMENT FOR SECURE USER AUTHENTICATION BASED ON A BIOMETRIC DATA DETECTION DEVICE

CROSS REFERENCE TO RELATED APPLICATION

This application is a national phase application based on PCT/EP2006/012204, filed Dec. 19, 2006, the content of which is incorporated herein by reference.

FIELD OF THE INVENTION

The present invention relates to method and arrangement for secure user authentication based on a biometric data detection device.

BACKGROUND OF THE INVENTION

Nowadays, computer terminals (e.g. portable personal computers) and telecommunication terminals (e.g. mobile phones) are used by almost every person. These user terminals (providing computing and/or communication functions to the user) often store personal or confidential information, for example the so-called "sensitive data".

Additionally, these user terminals are often used for carrying out money transactions, for example buying products/services or managing bank accounts or for connecting to confidential computer/storage systems.

Therefore, the secure authentication of the user of these user terminals is very important.

A first well known solution to this problem is the use of userid/password pairs; in this case, security relies on the fact that only the rightful user knows a valid and authorized userid/password pair.

A second well known solution to this problem is the use of smartcards; in this case, security relies on the fact that only the rightful user holds a valid and authorized smartcard.

Both these solutions are not completely satisfactory even if used together.

Recently, the use of biometric data for authentication purposes is becoming popular. Biometric authentication refers to technologies that measure and analyze human physical and behavioural characteristics for authentication purposes. Examples of physical characteristics include fingerprints, eye retinas and irises, facial patterns and hand measurements, while examples of mostly behavioural characteristics include signature, gait and typing patterns. Voice is considered a mix of both physical and behavioural characteristics.

There are already on the market some portable personal computers and mobile phones with an integrated fingerprints detector for enabling the use of the terminal in alternative or in addition to the input of "credential information" by the user.

From patent application US20040257196, there is know a method using one or more biometric sensors (for example a fingerprint scanner) for controlling the access to a wireless communication apparatus or to a feature or service provided via the wireless communication apparatus. According to this patent application, a sensor may be internal (i.e. integrated) or external to the apparatus; an external sensor may be connected either wirelessly over a wireless local area network such as Wi-Fi or Bluetooth™ or via a wired connection.

From patent application WO03007125, there is known a secure network and networked devices using biometrics. According to this patent application, a biometric data sample is taken and compared with stored biometric data. If the biometric data sample matches the stored data, access to a secure data storage module is enabled. The secure data storage module contains data necessary for successful communication with a server. Accordingly, a biometric data match enables sensitive data retrieval, and ultimately secure communication with another device. In a preferred embodiment, a SIM in a GSM phone provides stored biometric data and processing capabilities for the matching function within a cellular phone. By storing biometric data on the SIM (i.e. a type of smartcard) and performing the biometric matching process on the SIM, the need to transmit or store biometric data in a way that leaves it available for retrieval or tampering is reduced.

SUMMARY OF THE INVENTION

The Applicant has noticed that although the possibility has already been considered of having a computer or telecommunication terminal in (wired or wireless) communication with an external biometric data detection device for authentication purposes, no attention was paid to the fact that the so-transferred biometric data are quite easy to be tampered; for example, according to some of the solutions according to patent application WO03007125 (i.e. those providing for an external sensor in communication with the terminal), it would not be difficult to transfer to the terminal the biometric data of a rightful user previously stored and not those presently detected.

Additionally, the Applicant considers that if a secure authentication service is to be offered to a customer, it is preferable not to make assumptions or set requirements on the features of the customer's terminal; specifically, if a secure authentication service is to be offered to mobile telephone subscribers, preferably the service should not require that the mobile phones of all the interested subscribers have an integrated e.g. a fingerprint scanner.

Therefore, the Applicant has tackled the problem of providing biometric authentication to a user terminal with high security for the authentication information and for the authentication process, independently from the user terminal and easily portable from one terminal to another.

It is the object of the present invention to provide a secure user authentication method improved with respect to the prior art and in particular that solves the above-mentioned problem.

The basic idea behind the present invention is to provide a terminal with a smartcard securely storing biometric information relating to at least one user and a biometric data detection device, and to let the smartcard and the device exchange biometric information between each other for authentication purposes; typically, such communication is realized through a radio interface in the device and a radio interface in the smartcard. In this way, tampering of the transferred biometric information is much more difficult. Additionally, biometric authentication is independent from the user terminal and easily portable from one terminal to another.

In the present patent application by smartcard it is meant an electronic module comprising at least a processor and a memory and provided with means for avoiding unauthorized access and operation on the memory; typical embodiments of such a smartcard (contact or contactless) are telecommunication subscriber identification modules, e.g. SIM cards or USIM cards, and memory cards, e.g. secure multimedia cards [SMMC™] or secure digital [SD™] cards.

In order to increase the security, one or more of the following measures may be used:
- a secure communication channel between the device and the smartcard,
- a direct (preferably short range) communication channel between the device and the smartcard,
- encryption and decryption of biometric information transferred between the device and the smartcard.

In order to increase further the security, during a configuration phase (that precedes the normal operation) specific association rules may be set between devices and/or smartcards and/or users to be authenticated; for example, a certain smartcard can communicate only with a certain device or a certain user can authenticate with a certain smartcard only through a certain device.

BRIEF DESCRIPTION OF THE DRAWINGS

The present invention will become more apparent from the following description to be considered in conjunction with the annexed drawings, wherein.

It is to be understood that the following description and the annexed drawings are not to be interpreted as limitations of the present invention but simply as exemplifications.

DETAILED DESCRIPTION OF THE INVENTION

Architecture

The arrangement according to the present invention is aimed at secure authentication of a user with a computer or telecommunication terminal.

Figure 1:
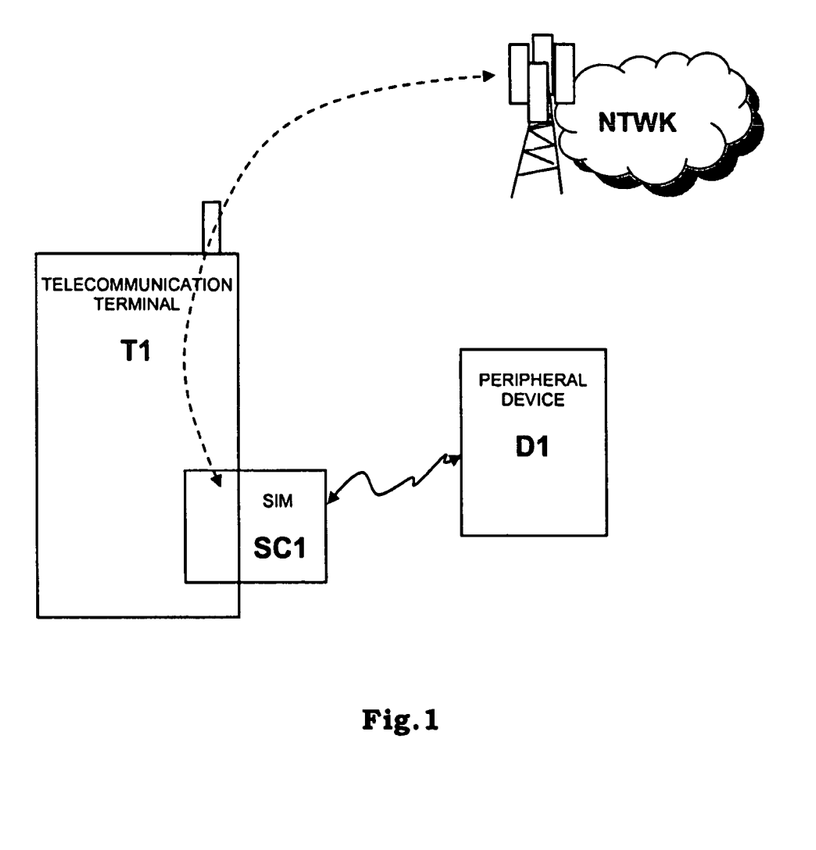
FIG. 1 shows schematically an arrangement according to the present invention.

FIG. 1 shows schematically a possible arrangement according to the present invention that essentially consists of a user telecommunication terminal T1, in particular a mobile phone, and a biometric data detection device D1, in particular a fingerprints peripheral device; peripheral device D1 is external to terminal T1; terminal T1 is provided with a smartcard SC1, in particular a SIM card.

It is to be noted that in the following reference will always be made to fingerprint as the biometric characteristic as it is the most easy and cheap way to implement the present invention—many and careful studies have already been done on it and they started decades ago; nevertheless, any other biometric characteristic can be used in order to implement the present invention, for example physical biometric characteristics such as eye retinas/irises, facial patterns and hand measurements, or behavioural biometric characteristic such as voice, signature, gait and typing patterns.

In FIG. 1, also a base station of a mobile telephone network NTWK is shown in order to clarify that terminal T1 thanks to SIM card SC1 is able to make phone calls as a normal mobile phone by connecting to the base stations of a mobile telephone network. Device D1 and smartcard SC1 are adapted to communicate directly together (as it is schematically shown in FIG. 1); to this regard, not only device D1 comprises a radio interface but also smartcard SC1 comprises a radio interface.

The communication used in the embodiment of FIG. 1 is advantageously based on a "proximity channel" and may be implemented e.g. through the Bluetooth™ technology or the ZigBee™ technology; in the present case, the limited coverage of a "proximity channel" is an advantage from the security point of view as biometric information needs to be exchanged only between the device and the smartcard and, according to most practical applications of the present invention, these are located very close to each other (less than 1 meter and typically few tens of cm).

Smartcards, in particular telecommunication subscriber identification modules, provided with this communication feature are known both from the internal architecture point of view and from the internal operation point of view e.g. from patent applications WO2005104584 and WO2006056220 of the same Applicant.

It is to be noted that, in order to implement the present invention, specific functonalities (implemented e.g. in firmware) are necessary for the smartcard of the terminal. Two main functionalities are its ability to securely store biometric information and its ability to exchange (transmitting and/or receiving) biometric information through its radio interface. Other important functionalities will be described in the following.

In the present application, by biometric information it is meant either raw biometric data (such as an image of a fingerprint) or processed biometric data (such as a template of a fingerprint corresponding to the "minutiae" of the fingerprint); processed biometric data are usually much smaller in size than raw biometric data and are usually used for biometric comparisons.

Peripheral device D1 comprises a radio interface, a fingerprint sensor and one or more processors with memory of one or more kinds for programs and data. Typically, a processor dedicated to fingerprints data processing is provided.

It is to be noted that, in order to implement the present invention, specific functonalities (implemented in hardware and e.g. in firmware) are necessary for the device. A main functionality is its ability to exchange (transmitting and/or receiving) biometric information through its radio interface. Other important functionalities will be described in the following.

The internal hardware of terminal T1 communicates with smartcard SC1 through standard mechanisms (e.g. Application Protocol Data Unit [APDU]), or through analogous proprietary mechanisms.

Smartcard SC1 establishes a direct and secure dialog (through e.g. the proximity communication channel) with device D1 in order to use a biometric technology for authenticating a user and thus allow the use of services provided by smartcard SC1 and/or by terminal T1 and/or by the telecommunication network.

Smartcard SC1 stores one (or more) piece of biometric information relating to one (or more) user to be authenticated; in the example of FIG. 1, SIM card SC1 stores one (or more) fingerprint template of a user, that will be called in the following "reference fingerprint template", and thus assures security and portability of "sensitive data".

Smartcard SC1 contains at least one service logic (e.g. a service for "mobile commerce") that provides for interaction with a user and through the network connection may finalize the choices of the user. This service implemented by smartcard SC1 requires at a certain point the authentication of the user and according to the present invention this is carried out at least partially biometrically. To this purpose, smartcard SC1 communicates directly with peripheral device D1 without using the resources (hardware and software) of terminal T1.

According to a first possibility (first embodiment), device D1 receives from smartcard SC1 the reference fingerprint template and matches it with a fingerprint template deriving from the fingerprint data detected by its fingerprint sensor; the result of this matching is transmitted by device D1 to smartcard SC1. To this purpose, a challenge/response mechanism is used; smartcard SC1 transmits to device D1 a "challenge" word and device D1 replies to smartcard SC1 with another word being the (preferably encrypted) coding of this challenge word; the coding depends upon the result of this matching.

According to a second possibility (second embodiment), smartcard SC1 receives from device D1 a detected fingerprint template (deriving from the fingerprint data detected by the fingerprint sensor of device D1) and makes a match between the reference fingerprint template (stored locally) and the detected fingerprint template. The detected fingerprint template may be encrypted by device D1 before being transmitted to smartcard SC1, and consequently decrypted within smartcard SC1.

In both the above-mentioned cases, at the end, smartcard SC1 knows the result of the match between a reference fingerprint and a detected fingerprint. Based on this matching, smartcard SC1 proceeds with the above-mentioned service according to its stored logic.

The interactions with the user may take place mainly through a display of terminal T1 and additionally through a speaker and a microphone of terminal T1. To this purpose, standard mechanisms are used such as the SIM Application ToolKit.

The above-mentioned service may provide a dialog between an application client (that may be implemented e.g. by an applet in the smartcard) and an application server across the communication network NTWK; this may be carried out through SMS messages or a data channel (GSM, GPRS or UMTS).

Smartcard Implementation

Figure 2:
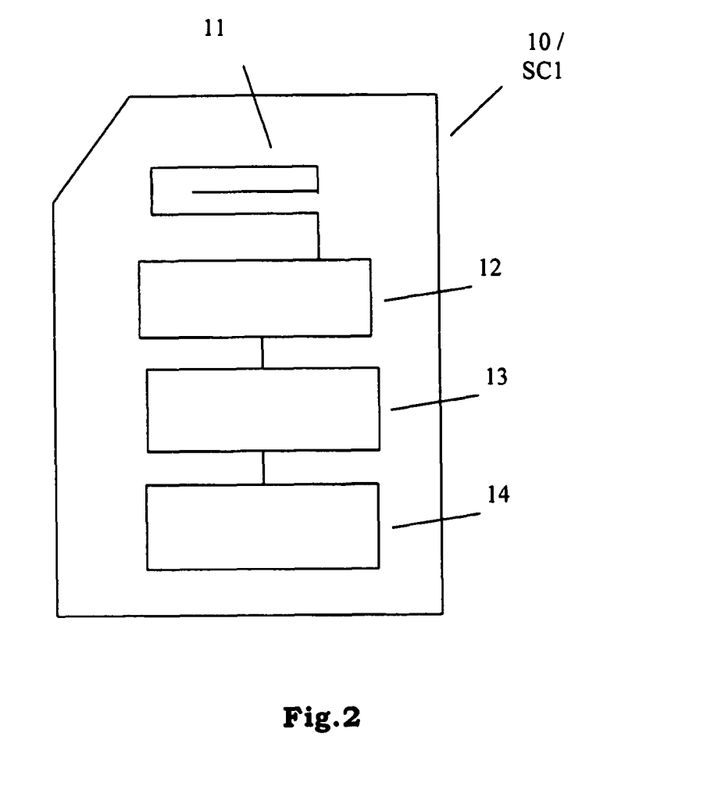
FIG. 2 shows schematically the hardware architecture of the smartcard of FIG. 1.

FIG. 2 shows schematically the hardware architecture of smartcard (SIM card) SC1 of FIG. 1.

The smartcard is indicated with reference numeral 10/SC1; all the elements shown in the figure are integrated in the smartcard, in particular, the elements necessary for communicating according to e.g. the ZigBee™ technology including an antenna.

The smartcard essentially comprises:
a security element 14 like any SIM card,
a radio protocol processing element 13,
a transceiver element 12 for modulating/demodulating the signals transmitted/received through the radio channel(s),
an antenna element 11.

Security element 14 is a processing and storage module and comprises at least a processor and memories; this module allows and controls the exchange of biometric information (through a direct secure communication channel) including processing thereof for example encryption and decryption. More information on such a kind of smartcards can be derived from the above-mentioned patent applications of the same Applicant.

The service and application parts of the invention carried out by the smartcard are implemented by element 14; this element, in addition to carrying out the SIM functionality for the telecommunication terminal, uses the radio functionality provided by element 13 when required.

Figure 3:
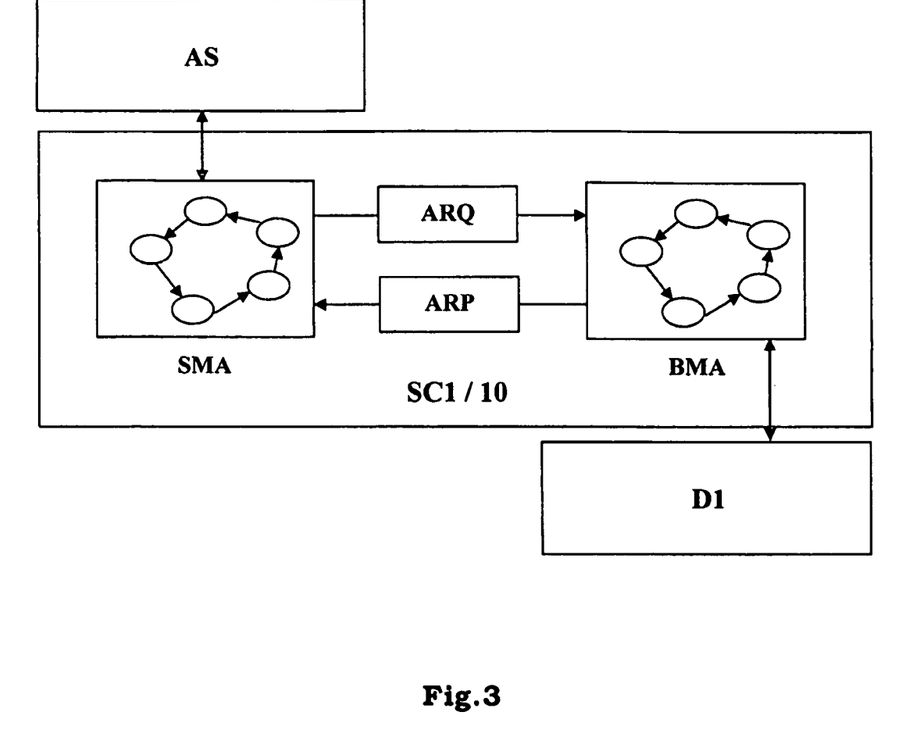
FIG. 3 shows schematically the software architecture of the smartcard of FIG. 1.

FIG. 3 shows schematically the software processes architecture of smartcard (SIM card) SC1 of FIG. 1.

Regarding the processes architecture, the smartcard is characterized by two main software components: service management applet SMA and biometric management application BMA.

The diagram of FIG. 3 shows the interactions between these two components and with the external entities, i.e. biometric peripheral device D1 (through a wireless channel) and an application server AS (through the telecommunication network NTWK); the application client is implemented by the service management applet.

Applet SMA realizes all the functionalities provided according to the service. When the service requires the authentication of the user, it sends an authentication request ARQ (that may include a "challenge" word) to application BMA that sends back an authentication reply ARP corresponding to the "result" of the authentication; authentication reply ARP a simple "OK/FAIL" or a (preferably encrypted) coding of a "challenge" word. This word may be generated by applet SMA or by server AS; in latter case, this word is first received by applet SMA and then forwarded to application BMA. The functionalities of application BMA include the management of the communication with biometric peripheral device D1, the processing of authentication requests ARQ by applet SMA and generation of authentication replies ARP to applet SMA; additionally, other functions such as so-called "imprinting", "primary enrolment", "secondary enrolment", "security root update" that will be described in the following may advantageously be carried out by application BMA. Application BMA may be carried out by element 14 or by element 13 or partially by element 14 and partially by element 13; this depends on the specific embodiment.

Biometric Device Implementation

Figure 4:
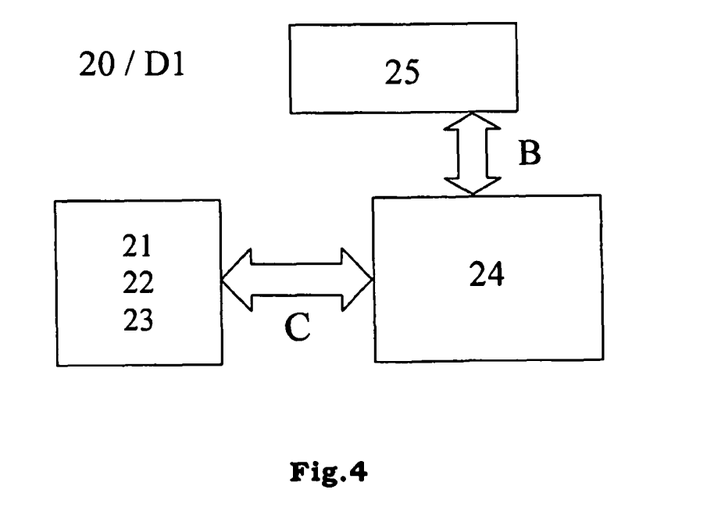
FIG. 4 shows schematically the hardware architecture of the biometric peripheral device of FIG. 1.

FIG. 4 shows schematically the hardware architecture of the biometric peripheral device D1 of FIG. 1.

The device is indicated with reference numeral 20/D1; all the elements shown in the figure are preferably embedded in the device, in particular, the elements necessary for communicating according to e.g. the ZigBee™ technology including an antenna. Three key components are shown in the figure: a biometric sensor 25 (in particular a fingerprints scanner), a processing module 24 and a communication module labelled as 21/22/23. Two interfaces B, C are defined between these three components; interface B is between sensor 25 and module 24; interface C is between module 24 and module 21/22/23. Module 24 comprises at least a processor and memories; this module allows and controls the exchange of biometric information (through a direct secure communication channel) including processing thereof for example encryption and decryption.

Device 20/D1 is portable and power supplied by a small battery such as e.g. a "button battery" which is not shown in the figure.

The communication module is labelled with three references as it comprises three elements 21 (antenna), 22 (transceiver element), 23 (radio protocol processing element) substantially corresponding to the elements 11, 12, 13 of the smartcard.

Module 24 is the main processor of the device and is in charge of any data processing to be carried out by the biometric device (in particular biometric data and/or information processing) with the exception of the transmission and reception ones.

It is to be noted that nowadays there are available on the market both chipsets for wireless communication and chipsets for fingerprints processing; if such chipsets are used, the main processor may be in charge only of implementing the application logic. Through interface B, sensor 25 transmits to module 24 raw biometric data so that processor 24 builds a fingerprint image, process it and generate a fingerprint template. Through interface C, module 24 communicates with module 21/22/23 so that fingerprint data (raw data) and/or information (processed data, for example templates) may be exchanged with the smartcard of the terminal.

Module 21/22/23 is able to remain in a power save mode; in this state device D1 is power saving and all functionalities are switched off. Module 21/22/23 is able to exit this status as soon as an internal interrupt happens (it could be an event driven by the user). Alternatively, the module 21/22/23 could be able to wake up transceiver element 22 with a power save duty cycle (for example using a timer) in order to receive a "wake up" message from the smartcard; to this regard, transceiver element is switched periodically for a short period of time.

Then, the biometric device in addition (typically in parallel) to detecting a fingerprint transmits to the smartcard a "ready" notification (in reply to the "Wake up" message); in this way, the biometric device can check whether a smartcard is ready for communication and is in a status requiring authentication of a user. If these conditions are satisfied, the biometric authentication process will take place.

Interaction Between Device and Smartcard

First Embodiment

According to a first embodiment of the present invention (that may be implemented through the hardware architectures shown in FIG. 1, FIG. 2 and FIG. 4), device D1 receives from smartcard SC1 a reference fingerprint template and matches it with a fingerprint template deriving from the fingerprint data detected by its fingerprint sensor; the result of this matching is transmitted by device D1 to smartcard SC1.

Figure 5:
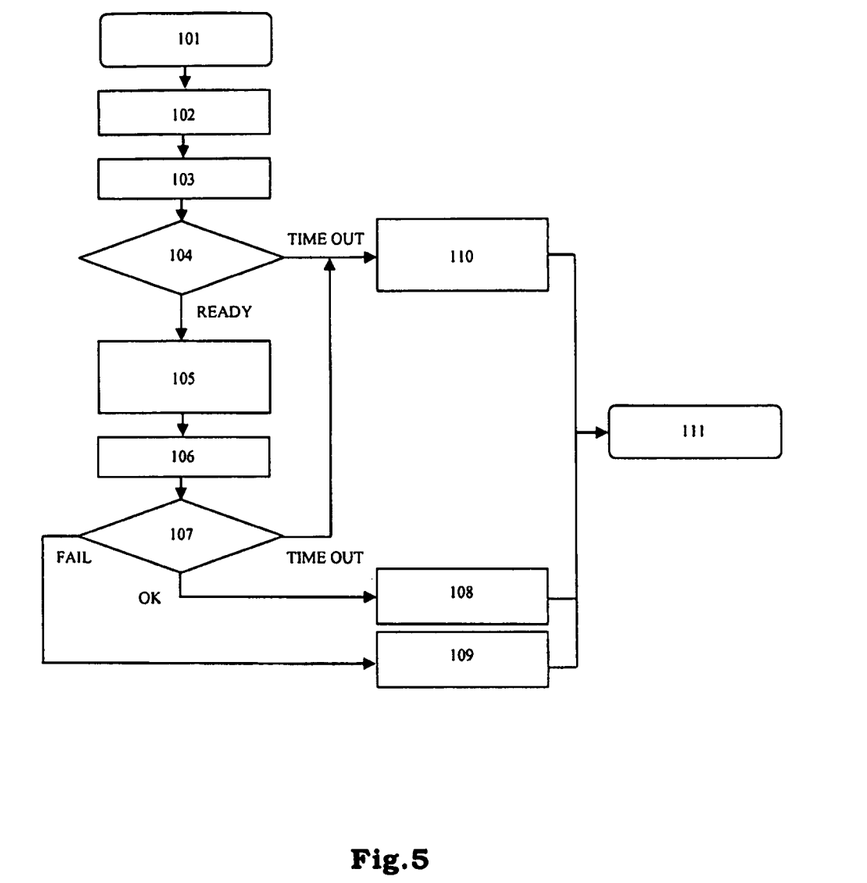
FIG. 5 shows the flowchart of the part of a first authentication procedure carried out in a smartcard of a terminal.
Figure 6:
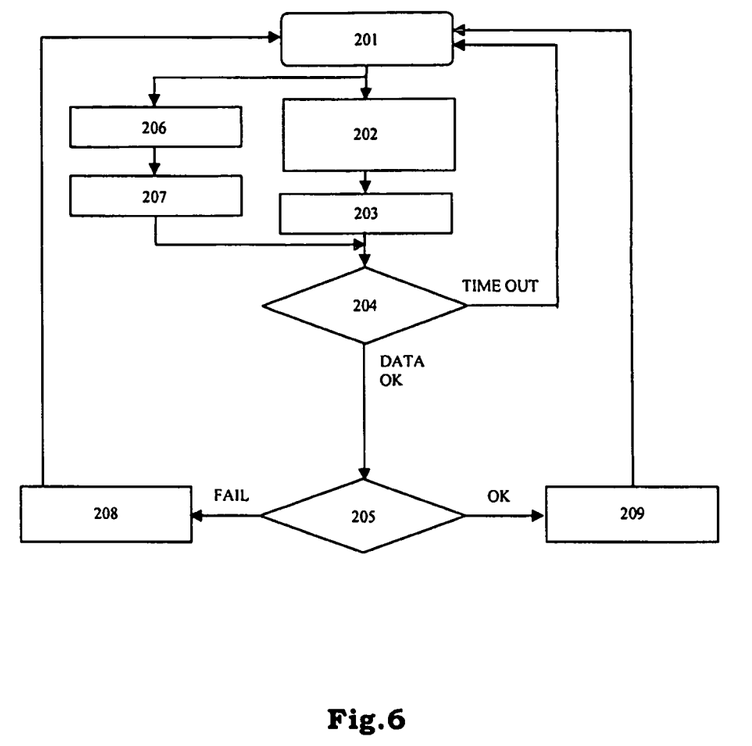
FIG. 6 shows the flowchart of the part of a first authentication procedure carried out in a biometric peripheral device.

The authentication procedure according to this first embodiment is shown in FIG. 5 and FIG. 6; FIG. 5 relates to the steps carried out in the smartcard, in particular by a biometric management application, while FIG. 6 relates to the steps carried out in the biometric device.

The flowchart of FIG. 5 relates to steps carried out by the biometric management application as a consequence of a request of biometric authentication by a service management applet running in the smartcard; FIG. 3 can be considered for clarification.

The steps of the flowchart of FIG. 5 are numbered according to the following list:
101: start of the flowchart,
102: displaying a message to the user of the terminal such as "swipe finger",
103: sending a wake up message and initializing a TIMER
104: waiting cycle with two exit conditions: "TIME OUT", i.e. the TIMER has counted till a predetermined time out but the smartcard has not received from the peripheral device a confirmation of being ready, or "READY", i.e. the smartcard has received from the peripheral device a confirmation of being ready for detecting and matching a fingerprint,
105: transmitting to the peripheral device the reference fingerprint template and a "challenge" word,
106: initializing a TIMER
107: waiting cycle with three exit conditions: "TIME OUT", i.e. the TIMER has counted till a predetermined time out but the smartcard has not received from the peripheral device a reply in terms of matching result, or "OK", i.e. the smartcard has received from the peripheral device a reply corresponding to a positive matching between the reference fingerprint template and the detected fingerprint template, or "FAIL", i.e. the smartcard has received from the peripheral device a reply corresponding to a negative matching between the reference fingerprint template and the detected fingerprint template,
108: notifying to the service management application the positive matching,
109: notifying to the service management application the negative matching,
110: notifying to the service management application that no matching was carried out due to unavailability of the peripheral device (due to e.g. no swiping of a finger) the negative matching.
111: end of the flowchart.

Some further explanations follow.

Through standard or proprietary commands, the smartcard requests the terminal to display one or more messages guiding the user thorough the biometric authentication.

Thereafter, the smartcard sends a "wake up" message and waits from its radio interface a "READY" message; if this message is not received within a predetermined time period, a time out lapses and this means that the user has decided not to proceed with the biometric authentication; this is notified to the service application applet; it is to be noted that the lack of reply could also be due to bad or no operation of the biometric peripheral device.

If a "READY" message is received, this means that a user has swiped his fingertip on the sensor. In this case, the reference fingerprint template (i.e. a fingerprint template of a user known to the smartcard, for example its owner or rightful holder) is transmitted from the smartcard to the peripheral device though their two radio interfaces preferably together with a "challenge" word. The reference fingerprint template is used for carrying out the matching while the "challenge" word is used for replying in a very secure way; in fact, the "challenge" word is coded (more preferably encrypted) differently according to the result of the matching.

The smartcard waits for the reply from the peripheral device, i.e. the "challenge" worded coded by the peripheral device according to the result of the matching; the biometric management application decodes the coded "challenge" word and understands whether the matching and thus the authentication has been "succeeded" or "failed"; finally, the biometric management application notifies the authentication result to the service management applet.

The flowchart of FIG. 6 relates to steps carried out by the biometric peripheral device in conjunction to a request of biometric authentication by a service management applet running in the smartcard.

The steps of the flowchart of FIG. 6 are numbered according to the following list:
201: start and end of the flowchart,
202: transmitting a "READY" message to the smartcard,
203: initializing a TIMER,

204: waiting cycle with two exit conditions: "TIME OUT", i.e. the TIMER has counted till a predetermined time out but the device has not received from the smartcard a fingerprint template and a "challenge" word, or "DATA OK", i.e. the device has received from the smartcard device a fingerprint template and a "challenge" word i.e. the necessary data that correspond to a request of authentication by the smartcard,

205: matching the detected fingerprint template and the received (i.e. reference) fingerprint template and determining if it is a positive matching, i.e. "OK", or a negative matching, i.e. "FAIL",

206: capturing a fingerprint image and generating raw fingerprint data,

207: deriving from the raw fingerprint data processed fingerprint data i.e. fingerprint information e.g. a fingerprint template,

208: transmitting to the smartcard a negative reply to the request of authentication, i.e. the "challenge" word coded in a first way,

209: transmitting to the smartcard a positive reply to the request of authentication, i.e. the "challenge" word coded in a second way; it must be clear that steps 206 and 207 are carried out substantially contemporaneously to steps 202 and 203.

Some further explanations follow.

The peripheral device is usually in an "idle" status wherein the processor and the radio interface could is off alternatively is active according to a power save duty cycle. In the first case, the peripheral device exits this status as soon as an internal interrupt happens (e.g. the user switch on the peripheral device); in the second case, the peripheral device is able to receive the "wake up" message from the smartcard and go on with the flowchart operations. Thereafter, the device awakes and an image of the fingertip, i.e. a fingerprint, is detected and processed in order to generate a fingerprint template in a per se known way. Substantially contemporaneously, the device generates a "READY" message and transmits it to the smartcard; such message aims at establish a communication channel with the smartcard that is preferably secure.

If the smartcard does not reply within a predetermined time period, a time out lapses and the device comes back to its "idle" status. If it dose reply, the device receives a fingerprint template (i.e. a "reference" fingerprint template) to be used for matching preferably together with a "challenge" word to be used for replying.

As already said, the "challenge" word is coded (more preferably encrypted) differently according to the result of the matching. In particular, if "F" is a two-variables secure function (e.g. a secure hash function), the words transmitted by the device to the smartcards are F(challenge-word,OK) and F(challenge-word,FAIL) wherein OK may be a logical one and FAIL may be a logical 0.

The use of a secure function for transmitting the result of the matching is an additional secure measure if a secure communication channel is already established between the smartcard and the device.

Interaction Between Device and Smartcard

Second Embodiment

According to a second embodiment of the present invention (that may be implemented through the hardware architectures shown in FIG. 1, FIG. 2 and FIG. 4), smartcard SC1 receives from device D1 a detected fingerprint template (deriving from the fingerprint data detected by the fingerprint sensor of device D1) and makes a match between a reference fingerprint template (stored locally) and the detected fingerprint template.

Figure 7:
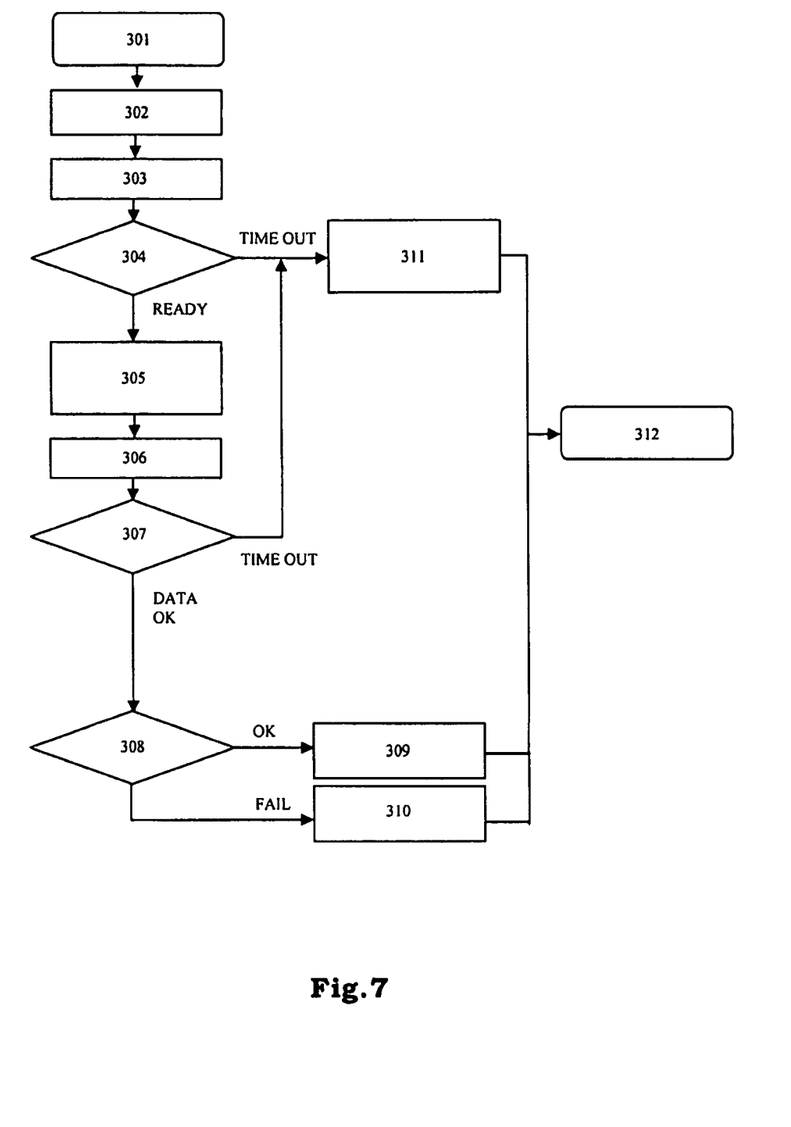
FIG. 7 shows the flowchart of the part of a second authentication procedure carried out in a smartcard of a terminal.
Figure 8:
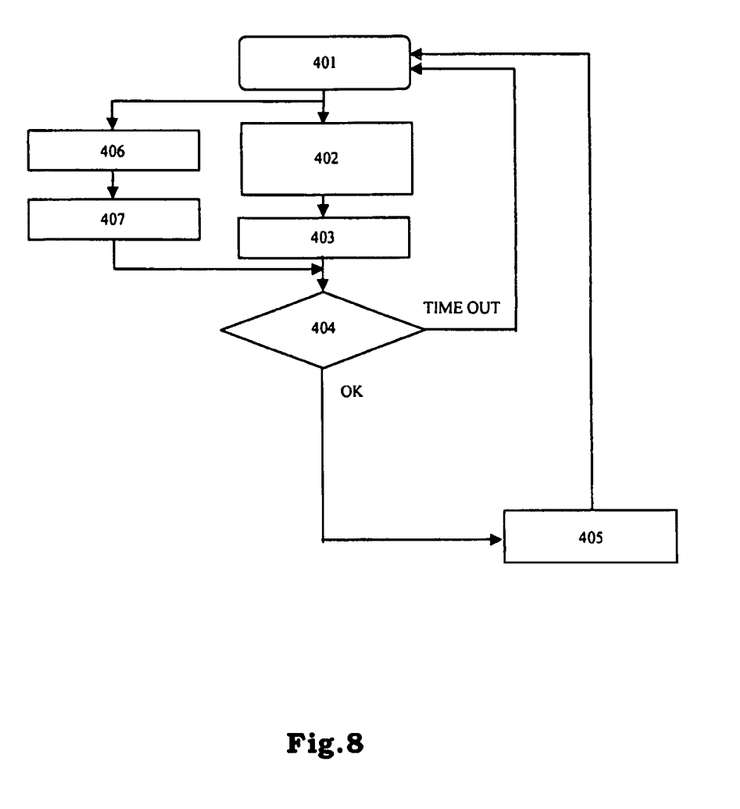
FIG. 8 shows the flowchart of the part of a second authentication procedure carried out in a biometric peripheral device.

The authentication procedure according to this second embodiment is shown in FIG. 7 and FIG. 8; FIG. 7 relates to the steps carried out in the smartcard, in particular by a biometric management application, while FIG. 8 relates to the steps carried out in the biometric device.

The flowchart of FIG. 7 relates to steps carried out by the biometric management application as a consequence of a request of biometric authentication by a service management applet running in the smartcard; FIG. 3 can be considered for clarification.

The steps of the flowchart of FIG. 7 are numbered according to the following list:

301: start of the flowchart,

302: displaying a message to the user of the terminal such as "swipe finger",

303: sending a "wake up" message and initializing a TIMER

304: waiting cycle with two exit conditions: "TIME OUT", i.e. the TIMER has counted till a predetermined time out but the smartcard has not received from the peripheral device a confirmation of being ready, or "READY", i.e. the smartcard has received from the peripheral device a confirmation of being ready for detecting a fingerprint,

305: transmitting to the peripheral device a request of fingerprint detection,

306: initializing a TIMER

307: waiting cycle with two exit conditions: "TIME OUT", i.e. the TIMER has counted till a predetermined time out but the smartcard has not received from the peripheral device a detected fingerprint template, or "DATA OK", i.e. the smartcard has received from the peripheral device a detected fingerprint template,

308: matching the received detected fingerprint template and a pre-stored reference fingerprint template and determining if it is a positive matching, i.e. "OK", or a negative matching, i.e. "FAIL",

309: notifying to the service management application the positive matching,

310: notifying to the service management application the negative matching,

311: notifying to the service management application that no matching was carried out due to either no availability of the peripheral device or no reception of a detected fingerprint template,

312: end of the flowchart.

It is to be noted that many of the steps of FIG. 7 are similar to the steps of FIG. 5.

The flowchart of FIG. 8 relates to steps carried out by the biometric peripheral device in conjunction to a request of biometric authentication by a service management applet running in the smartcard.

The steps of the flowchart of FIG. 8 are numbered according to the following list:

401: start and end of the flowchart,

402: transmitting a "READY" message to the smartcard,

403: initializing a TIMER,

404: waiting cycle with two exit conditions: "TIME OUT", i.e. the TIMER has counted till a predetermined time out but the device has not received from the smartcard a request of fingerprint detection, or "DATA OK", i.e. the device has received from the smartcard device a request of fingerprint detection,

405: transmitting to the smartcard the detected fingerprint template (a previous encryption may be provided),

406: capturing a fingerprint image and generating raw fingerprint data,

407: deriving from the raw fingerprint data processed fingerprint data i.e. fingerprint information e.g. a fingerprint template;

it must be clear that steps 406 and 407 are carried out substantially contemporaneously to steps 402 and 403.

Security Aspects

A very high level of security can be guaranteed if in the above described arrangement intrinsically secure elements are used; if fact, a smartcard may be an intrinsically secure element (even more a SIM card), ZigBee™ may be an intrinsically secure technology; it is to be noted that even with the biometric peripheral device a secure element could be used.

Additionally, preferably, these secure elements authenticate each other; in this way, the arrangement corresponds to a secure combination of elements that in turn are intrinsically secure.

The ZigBee™ technology is adapted to establish secure communication channels. If another wireless technology is used (for example Bluetooth™), security in the communication may be obtained by systematically encrypting any transmitted information or by encrypting only transmitted sensitive information.

According to a specific embodiment of the present invention, for security purposes, four configuration operations are provided to be carried out during respective configuration phases. These configuration operations are the following:

C1) "imprinting",
C2) "primary enrolment",
C3) "secondary enrolment",
C4) "security root update";

In this embodiment, anyway, operations C3 and C4 are optional.

The imprinting operation is typically carried out only once and is aimed at unique associating the smartcard and the biometric peripheral device. It is to be noted that, as it will be better clarified in the following, according to alternative embodiments of the present invention, a smartcard can be uniquely associated to a certain number of biometric devices whereas a biometric device is typically uniquely associated to one smartcard.

The imprinting operation is implemented by means of a secure process, between the smartcard in the user terminal and the biometric device, without involving third devices as for example a personal computer or a server.

After the such imprinting operation, this smartcard will be able to request and obtain a biometric authentication only through this device and this device will be able to carry out biometric authentication only for this smartcard.

For security reason, the imprinting operation is irreversible or at least user can not repeat it more than once; anyway, it may be provided that a "super-user" or "administrator" (for example, the service provider and/or the telecom operator) is able to reset the smartcard and/or the peripheral device.

In the security hierarchy according to this embodiment, there is defined a "primary user" (typically the owner or rightful holder of the smartcard) who has higher rights or privileges; additionally, there could be also at least one "secondary user" who has rights or privileges lower than the primary user; finally, there could be also an "administrator" (for example, the service provider and/or the telecom operator) who has the highest rights and privileges. Just as an example, if the "primary user" is a person, a first "secondary user" could be his/her spouse and a second "secondary user" could be his/her son/daughter.

Figure 9:
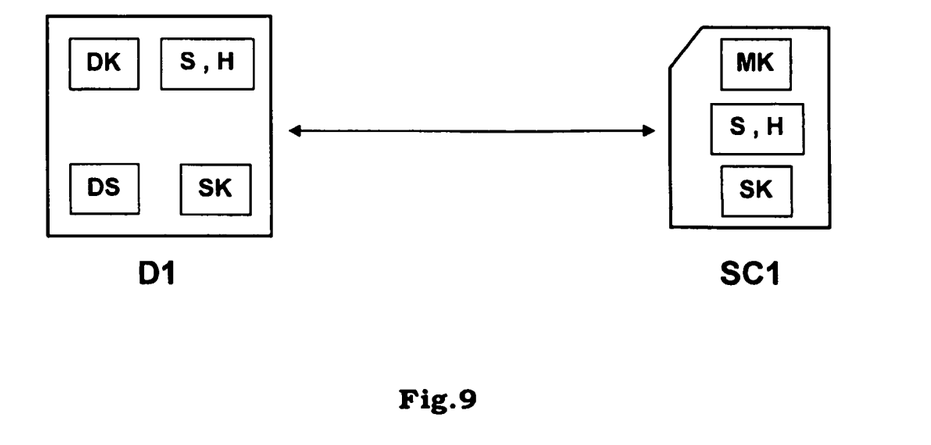
FIG. 9 shows schematically the biometric peripheral device and the smartcard of FIG. 1 wherein the key security elements are highlighted.

In FIG. 9, the smartcard SC1 and the biometric peripheral device D1 are shown together with key security elements; the communication channel between them is also indicated.

The security elements shown are the following:

master key MK: an encryption key stored in a read-only memory only within the smartcard; such key is preferably uniquely associated to the smartcard, device serial number DS: a identification code stored in a read-only memory only within the device that is preferably uniquely associated to the device, device key DK: an encryption key stored preferably in an OTP [One Time Programmable] memory only within the device generated during a configuration phase; such key is preferably uniquely associated to the device but derives from information (e.g. key MK) related to the smartcard, secure hash function SHF (simply H in the drawing): a security function (hash class with key), preferably a proprietary secure hash function, used for sign "challenge" words during some configuration operations; this function is stored in a read-only memory both within the smartcard and within the device and is not public, (this function has two parameters: the first one is the piece of data to be encrypted and the second one is the key to be used for encryption), secure symmetrical function SSF (simply S in the drawing): a security function (symmetrical class) used for encrypting the communication channel, (this function has two parameters: the first one is the piece of data to be encrypted and the second one is the key to be used for encryption), random challenge RC: a random word used, symmetrical key SK: an encryption key generated during a configuration phase and used for encrypting the communication channel; it preferably derives from information (e.g. key MK) related to the smartcard and on information (e.g. code DK) related to the device.

An OTP memory is a memory that can be electrically programmed only once and can not be erased afterwards; this device differs from a PROM in that the PROM requires a special circuit for being programmed while the OTP is programmed by a normal electronic component such as a microprocessor.

Regarding the term "read-only memory", it has been used to indicate a memory that is "non-volatile" and that is programmed typically at the manufacturing side. This device can be a ROM or an EPROM and alternatively even a EEPROM or FLASH provided that the smartcard or the device are not adapted to program it.

The imprinting operation takes place as follows (the communication between the smartcard and the device is based e.g. on the ZigBee™ technology and therefore the communication channel is a proximity channel):

1) in the smartcard the biometric management applet is activated and the "imprinting" function is selected,
2) the smartcard transmits a word RC to the device and requests serial number DS to the device,
3) the device replies:
   a) "FAILURE" if it has already a key DK in the OTP memory,
   b) SHF(DS,RC) and DS if the OTP memory is empty,
4) the smartcard checks SHF(DS,RC), creates a key DK=SSF (DS,MK) and transmits a piece of data corresponding to SSF(DK,SHF(RC,DS)) to the device,
5) the device extracts from this piece of data key DK and stores it into the OTP memory.

Once the imprinting operation has been carried out, it is possible to establish a secure (i.e. encrypted) communication channel between the smartcard and the device.

To this purpose, the following steps are carried out:
1) the smartcard transmits a word RC to the device,
2) the device transmits SHF(RC,DK) and DS to the smartcard,
3) the smartcard computes DK=SSF(DS,MK) and checks SHF(RC,DK),
4) if the check is positive, the device is authenticated and SK=SSF(RC,DK) is the symmetrical key used (by the smartcard and by the device) for encrypting the communication channel.

Through such secure channel it is possible to implement the normal operation of the arrangement and also the other configuration operations.

The "primary enrolment" operation serves for storing the biometric template, for example the fingerprint template, of the "primary user" within the smartcard.

This operation may consist in capturing the fingerprint of a certain finger of the primary user preferably a number of times and deriving from all the data a biometric template. This biometric template detected and processed by the device is then transmitted from the device to the smartcard that stores it in a secure way.

The "secondary enrolment" consists in adding further biometric templates of other users, i.e. "secondary users", within the smartcard.

The secondary users have the possibility of authentication through this device and this smartcard but can not do anything else.

In order to add secondary biometric templates, the authorisation of the primary user is necessary; in particular, immediately before adding a secondary template, the primary user has to authenticate and select the appropriate function.

This operation is enabled and triggered only by the current "primary user".

The primary user has the privilege not only to add secondary templates but also e.g. to remove secondary templates.

The following steps are carried out in order to add a secondary template:
1) in the smartcard the biometric management applet is activated and the "secondary enrolment" function is selected,
2) the smartcard carries out the authentication of the device and the establishment of a secure channel (as described above),
3) the smartcard requests authorisation to proceed by biometrically authenticating the primary user,
4) if the authentication is positive, the capturing, processing, transmitting and storing of the secondary biometric template is normally carried out (see above).

The "security root update" consists in an exchange operation, wherein the privilege of the current "primary user" is assigned to a "secondary user" and the privileges of this "secondary user" is assigned to the current "primary user". From a certain point of view, we may say that the smartcard and the corresponding device have been transferred or sold from the person who is now the "primary user" to the person who is now a "secondary user".

This operation is enabled and triggered only by the current "primary user".

The following steps are carried out in order to make a security root update:
1) in the smartcard the biometric management applet is activated and the "security root update" function is selected,
2) the smartcard carries out the authentication of the device and the establishment of a secure channel (as described above),
3) the smartcard requests authorisation to proceed by biometrically authenticating the primary user,
4) if the authentication is positive, the privileges are exhanged.

Application of the Invention to M-Commerce

The present invention may find different applications.

The biometric technologies find useful application to all the services where security is crucial.

In the field of M-Commerce, or Mobile Commerce, the users consider security a crucial aspect; in other words, if the users do not feel sufficiently confident that the system used for making mobile commerce transactions is secure they will never use the system.

Figure 10:
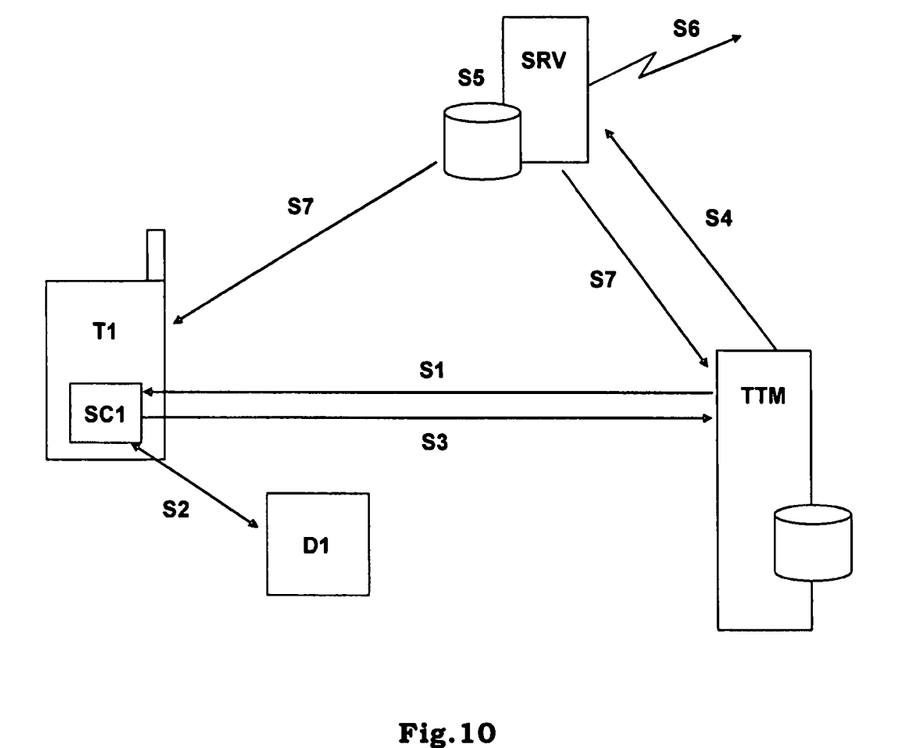
FIG. 10 shows schematically the architecture of a practical application of the present invention.

In the following, with reference to FIG. 10, there is described a case wherein the biometric arrangement according to the present invention is used for identifying and authenticating (in an easy and reliable way) a user who is interesting in using an electronic ticketing service (for example for theatres, cinemas, concerts, etc.).

A totem-shaped gate apparatus TTM is provided with a radio interface similar or identical to the one embedded in the smartcard SC1 described before. This gate apparatus TTM transmits a message to the smartcard SM1, that is fit within e.g. a mobile phone T1, containing an invitation to buy a ticket (S1). The service logic embedded within the smartcard SC1 interacts with the user through a message on the display of the mobile phone T1 and invites him to authenticate through a biometric device D1 (S2); the biometric device D1 is held by the user. In the first case, the matching between the biometric template stored in the smartcard and the biometric template detected and processed by the device may take place either within the device D1 or within the smartcard SC1. In the second case, the matching between the biometric template stored in the smartcard and the biometric template detected and processed by the device takes place within the smartcard SC1. If the matching is positive, the smartcard SC1 transmits in a secure way to the gate apparatus TTM a user identifier of the user (S3); the user identifier may be computed based on a unique code associated to the user, for example his biometric template or his IMSI code, and, if desired, data from the gate apparatus. The unique code used for computing the user identifier is stored in a secure way within the smartcard SC1 and within a remote server SRV that is in charge of providing the service and is never transmitted.

The gate apparatus TTM transmits a instruction of payment together with the user identifier to the remote server SRV (S4); the remote server SRV is provided with a database storing the information provided by all the users that subscribed to the service: personal data, method of payment (prepaid, credit card, wire transfer, . . . ), user identifier(s).

If the user is recognized based on the transmitted user identifier by the remote server SRV (S5), an interaction is established with a credit institute, for example a bank, (S6) in order to complete the financial transaction.

Thereafter, a receipt of payment is transmitted by the remote server SRV both to the terminal T1 of the user and to the gate apparatus TTM (S7); the gate. apparatus TTM stores all the receipts of payments received by the remote server SRV into a local database.

The user authentication by means of a biometric device may be useful also for updating or changing the data stored in the database of the remote server SRV; for example a user may be interested in changing the method of payment.

Alternatives and Extensions of the Invention

In general, the arrangement according to the present invention serves for secure user authentication and comprises at least one user terminal, e.g. a computer terminal or telecommunication terminal, with a corresponding smartcard and at least one biometric device; the smartcard is adapted to securely store biometric information relating to at least one user; the device is adapted to detect biometric data of users; both the smartcard and the device comprise a radio interface for communicating together and a module for exchanging biometric information between each other.

The communication module may be a hardware module or a software module or a mixed module.

The communication between the smartcard and the device is preferably secure through e.g. a secure direct communication channel; the communication channel is advantageously a proximity channel established through BlueTooth™ technology and preferably ZigBee™ technology.

The smartcard and/or the device may comprises a number of modules for carrying out various functions, for example communication protocol processing, encryption, decryption, biometric (in particular fingerprints) data processing. Any of these modules may be a hardware module or a software module or a mixed module.

In a typical case, the smartcard is a telecommunication subscriber identity module, such as a SIM card or a USIM card for a (GSM or UMTS) mobile cellular phone and the biometric device is a portable peripheral device for example in the shape of a pendant including a "button" battery; this solution is particular comfortable for e-shopping.

It is to be noted that even the biometric device could be provided with a secure chip; in this way, the whole communication environment (transmitter, receiver, communication channel) is secure; a possibility would be that the chip in charge of detecting biometric data would be a secure chip. It is not be excluded that the secure chip of the smartcard and the secure chip of the biometric device may be located within a same apparatus housing or even on the same PCB.

In general, the method according to the present invention serves for authenticating at least one user of a user terminal, e.g. a computer terminal or telecommunication terminal, and comprises the steps of:
  providing a device adapted to detect biometric data of users and comprising a device radio interface; and
  providing in the user terminal a smartcard adapted to securely store biometric information relating to at least one user and comprising a smartcard radio interface;
the device radio interface and the smartcard radio interface are adapted to communicate between each other; the authentication of the user is obtained by the steps of:
  A) detecting biometric data by means of the device;
  B) deriving biometric information from said detected biometric data;
  C) transferring said derived biometric information from the device to the smartcard or the stored biometric information from the smartcard to the device; and
  D) comparing the derived biometric information with the stored biometric information.

As it is clear, the above definition covers two cases; in the first case the comparison (or matching) is carried out within the smartcard while in the second case the comparison (or matching) is carried out within the device; in a typical (simple and effective) application of the present invention, the smartcard is adapted to securely store biometric information relating to only one user, i.e. the owner or rightful holder of the smartcard.

Anyway, the present invention may provide that the smartcard be adapted to securely store biometric information relating to a plurality of users according to the memory availability (these users may be the members of a family). In this way, the smartcard can be used for authenticating more than one user although a limited number.

The above defined steps relate to the normal operation, i.e. the authentication of a user.

Anyway, an important part of the present invention is the configuration; as clarified in the detailed description, a number of configuration operations may be provided during corresponding configuration phases.

A configuration operation consists in associating a smartcard with a device in order to be able to cooperate in the authentication of one or more users. The simplest case is that a smartcard is associated to only one device and vice versa; in this case, the smartcard and the biometric device are adapted to mutually authenticate when a dialogue is started. A second possibility is that a smartcard is associated to a limited number of devices.

Another configuration operation consists in storing biometric information relating to the only or a primary user of the arrangement into the smartcard.

The above configuration operations could be done by the service provider or the telecom operator. Anyway, it is more practical that they are carried out directly by the owner or rightful holder of the smartcard; in this case, particular care to security is necessary (as it appears from the detailed description of the embodiment).

The above configuration operation have to be carried out before using the arrangement for authentication.

Another configuration operation consists in adding biometric information relating to one or more secondary users to the smartcard. This operation, if desired or provided, can be done at any time.

Still another configuration operation is the change of the rights and privileges of the users. Also this operation, if desired or provided, can be done at any time.

It is to be noted that if the authentication of more than one user is provided, the smartcard(s) and/or the biometric device(s) comprise advantageously a users' database for storing the biometric information of the various users with the corresponding rights and/or privileges. In this case, the reply to an authentication procedure is not simply "FAIL" or "OK", but could be e.g. "FAIL" or "USER-ID".

In case of multiple associations (e.g. more than one biometric device), it may be useful that the smartcard(s) is provided with a database for storing information relating to such associations.

Regarding biometric information in particular fingerprint information, it has to be considered that raw biometric data are usually quite "bulky"; therefore, in the detailed description, processed biometric data, for example fingerprint templates, are considered both for transmitting and for processing; anyway, it would be possible to implement the present invention using simple raw biometric data.

Regarding encryption/decryption, many possibilities exist for implementing the present invention; in the detailed description, only a specific and advantageous possibility has been set out. In particular, it has been considered to use a secure, direct, short-range (i.e. proximity) communication channel implemented through the ZiggBee technology and, anyway, to encrypt the most sensitive data.

Regarding authentication, in the detailed description, it has been considered to swipe a single finger only once. Anyway, it is possible to provide that the same finger is swiped more than once or that more than one finger are swiped successively for the same authentication procedure. Additionally, biometric authentication may be combined with other kinds of authentication such as the input of a userid/password pair.

Finally, it is worth reminding that, alternatively to fingerprints, any other biometric characteristic can be used in order to implement the present invention, for example physical biometric characteristics such as eye retinas/irises, facial patterns and hand measurements, or behavioural biometric characteristic such as voice, signature, gait and typing patterns.

The invention claimed is:

1. A system for secure user authentication, comprising:
   a detection device for detecting biometric data of a user, comprising:
      a one time programmable memory storing a device key; and
      a first module for transmitting the detected biometric data through a first radio interface; and
   a smartcard comprising:
      a storage portion securely storing biometric information relating to at least one user;
      a read-only memory storing a master key; and
      a second module communicating with the first module through a second radio interface and receiving the transmitted biometric data detected by the detection device;
   wherein:
      the device key is uniquely associated with the detection device;
      the master key is uniquely associated with the smartcard;
      the device key of the detection device is derived from the master key of the smartcard and is uniquely associated with the smartcard; and
      the smartcard is configured to compare the received biometric data with the stored biometric information.

2. The system according to claim 1, wherein one of said first module or said second module is configured to establish a direct secure communication channel between said smartcard and said detection device.

3. The system according to claim 1, wherein at least one of said smartcard or said detection device comprises a third module for encrypting and/or decrypting the biometric information.

4. The system according to claim 1, wherein said smartcard is a telecommunication subscriber identification module.

5. The system according to claim 1, wherein at least one of said first or second radio interface is of a ZigBee™ type.

6. The system according to claim 1, wherein the first radio interface of said detection device is configured to stay in power save mode and to be woken periodically.

7. The system according to claim 1, wherein said detection device is portable and is external to a user terminal associated with the smartcard.

8. The system according to claim 1, wherein said biometric data correspond to fingerprint data and said biometric information corresponds to biometric templates.

9. The system according to claim 1, wherein said detection device comprises a read-only memory storing a device identification code.

10. The system according to claim 1, wherein the read-only memory of the smartcard securely stores an encryption key associated with the smartcard.

11. The system according to claim 1, wherein said detection device and said smartcard each stores an encryption key for encrypting a communication channel therebetween.

12. The system according to claim 1, wherein said detection device comprises a memory having a storage capacity for at least one encryption key associated with the detection device.

13. A method for secure user authentication, comprising:
   detecting, by a detection device, biometric data of a user;
   transmitting, by a first module of the detection device, the detected biometric data through a first radio interface;
   storing, by a smartcard, biometric information relating to at least one user;
   communicating with the first module, by a second module of the smartcard through a second radio interface;
   receiving, by the second module, the transmitted biometric data detected by the detection device;
   storing a master key in the smartcard, the master key being uniquely associated with the smartcard;
   storing a device key uniquely associated with the detection device in the detection device, the device key being derived from the master key of the smartcard and being uniquely associated with the smartcard; and
   comparing, by the smartcard, said received biometric data with said stored biometric information.

14. The method according to claim 13, further comprising securely storing biometric information relating to a plurality of users.

15. The method according to claim 13, comprising a configuration phase including mutually authenticating said detection device and said smartcard.

16. The method according to claim 15, wherein said configuration phase includes providing stored information related to said smartcard and said detection device.

17. The method according to claim 16, wherein said configuration phase includes detecting biometric data of a primary user through said detection device and securely storing biometric information derived from said detected biometric data of said primary user to said smartcard.

18. The method according to claim 17, wherein said configuration phase includes detecting biometric data of at least one secondary user through said detection device and securely storing biometric information derived from said detected biometric data of said at least one secondary user to said smartcard.

19. The method according to claim 18, comprising enabling, by said primary user, at least one of storage or removal of biometric information relating to the at least one secondary user.

20. The method according to claim 18, comprising:
   associating a first set of privileges with said primary user; and
   associating a second set of privileges with said at least one secondary user;
   wherein the first set of privileges is higher than the second set of privileges.

21. The method according to claim 13, further comprising a configuration phase including storing information related to said smartcard in at least a second device.

22. The method according to claim 13, wherein the step of transmitting further includes establishing a direct secure communication channel between said smartcard and said detection device.

23. The method according to claim 13, wherein the radio interface of said detection device stays in power save mode and is woken periodically in order to communicate with said smartcard.

24. The method according to claim 13, wherein the step of transmitting further includes encrypting the biometric data and the step of receiving further includes decrypting the encrypted biometric data.

25. The method according to claim 13, further comprising:
generating an encryption key based on information related to said smartcard and based on information related to said detection device, and
storing the encryption key in said detection device and in said smartcard for encryption/decryption use or for encrypting a communication channel between the detection device and the smartcard.

26. The method according to claim 13, comprising providing a service to a user through a user terminal.

27. The method according to claim 26, wherein the service is provided for a commercial transaction including communication of the user terminal with an application server, the user terminal and the application server being connected through a telecommunication network.

* * * * *